United States Patent Office 2,959,999
Patented Nov. 15, 1960

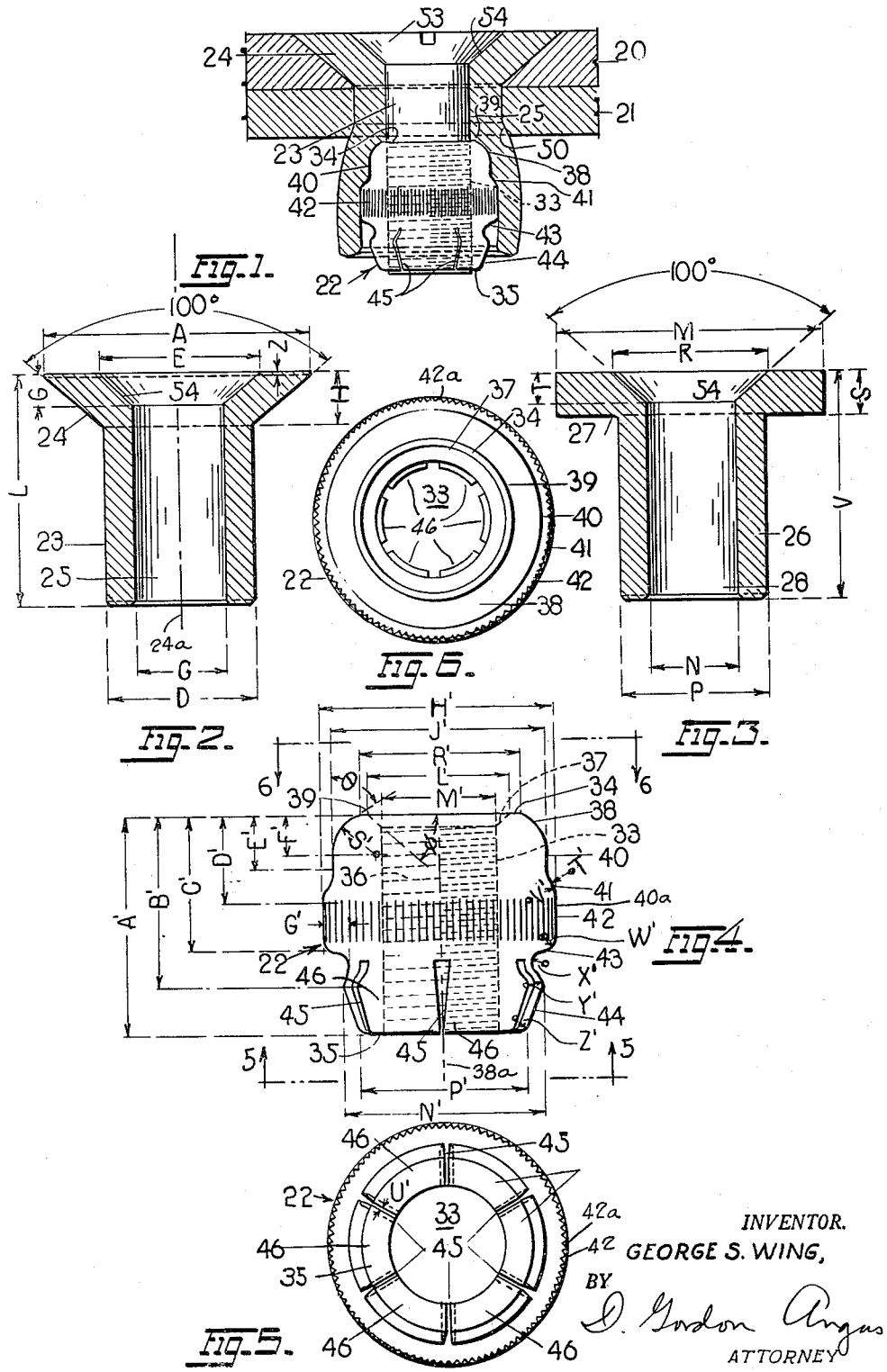

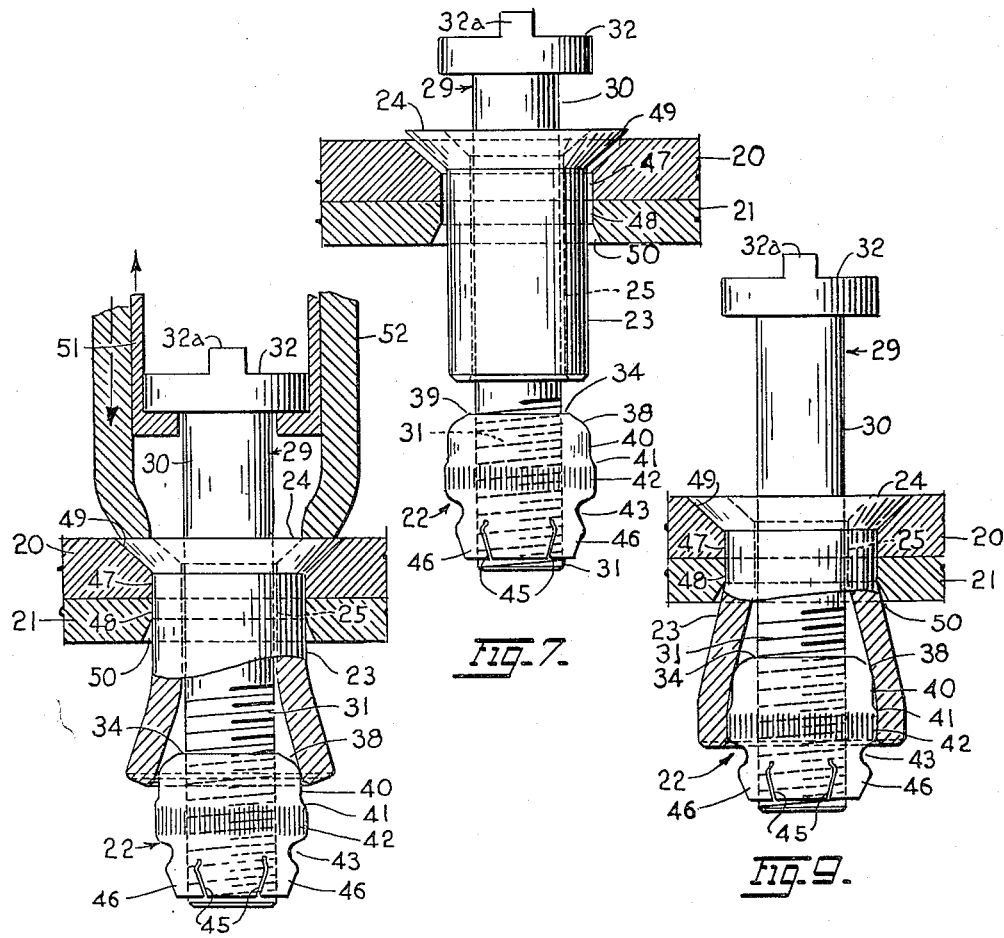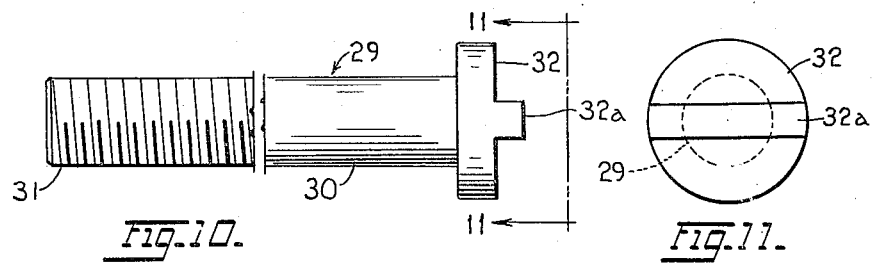

2,959,999

HOLLOW RIVET HAVING EXPANDER NUT WITH CURVED DEFLECTOR SECTION AND GROOVED LOCKING RIB

George S. Wing, Palos Verdes Estates, Calif., assignor, by mesne assignments, to Hi-Shear Rivet Tool Company, Torrance, Calif., a corporation of California Filed Feb. 23, 1954, Ser. No. 411,960

3 Claims. (Cl. 85—40)

This invention relates to blind riveting and has for its principal object to provide an effective and positively set blind rivet of relatively great strength.

A blind rivet commonly comprises a hollow head and shank through which an mandrel or stem protrudes from the front or head side to the back or shank end of the rivet. An expanding or setting device is attached to the end of the mandrel at the shank end of the rivet, with the expander at the rear of the rivet shank. This rivet containing such a mandrel is then inserted through holes in the sheets or devices to be riveted together. By bucking or holding the rivet head in place while pulling on the mandrel, the expander is caused to upset or deform the shank at the rear of the rivet to secure the rivet in position.

Such a blind rivet operation has heretofore been subject to many disadvantages. Since no setting mechanism can be placed back of the rivet as in the case of an ordinary rivet operation, the tightness of the set rivet is dependent on such operations as can be performed from the front or head side of the rivet by manipulation of the mandrel. This has resulted in rivets which are weaker than is often desired, or which are improperly set or which are too loose.

According to a previously known blind riveting practice, a tubular rivet is inserted in aligned holes in plates to be joined, and a mandrel is inserted into the tubular rivet from the working side and screwed to threads inside the extreme end of the rivet at the blind side. Then the shank end of the tubular rivet is pulled by the mandrel toward the plates to be joined, so that the rivet shank swells out at a position between the threads at the back of the sheets to be joined to form the upset at the blind side which bears against the back sheet. The swelling occurs at a significant distance in from the back end of the rivet, so that, even after the rivet is set, a considerable length of the threaded part of the tubular rivet protrudes beyond the swollen or upset section behind the work. Such a process has some disadvantages. For one, the strength attainable by use of such a rivet is not very great, since the tube must be weak enough to permit swelling of the walls in the described manner. Also, the relatively great protrusion of the rivet on the blind side of the work increases the clearances necessary in parts assemblies, both before and after assembly, which increases the bulk of the resulting products. There must also be a relatively great length of tube protruding from the rear of the work before setting, sufficient in relation to its diameter and wall dimensions to allow the wall to swell. A rivet of given diameter and shank length is useful only for a narrow range of total work thicknesses, and a number of individual rivet sizes must ordinarily be stocked, since if the threads come to the back plate, there is apt to be no swelling, and if the threads are too far from the back plate, the swelling may not occur at the proper place, against the back plate.

In another known type of blind riveting, the end of a tubular rivet is expanded by drawing a headed mandrel into the open end of the tube. The mandrel comprises a notched stem which is integral with an enlarged head. To set the rivet, the mandrel head is drawn into the tube by pulling on the mandrel. This expands the end of the rivet until the force exerted exceeds the tensile strength of the notched stem. The mandrel stem then breaks off from its head, leaving the mandrel head in the tubular rivet. This rivet, too, has some disadvantages. For example, the finally set condition of the tubular rivet is dependent on the breaking strength of the mandrel stem instead of on the total work needed to move the head of the mandrel the necessary distance into the particular tubular rivet being upset so as to form a properly upset blind end. The breaking strength depends on the dimensional accuracy with which the cross-section of the notch of the mandrel stem was made. Further disadvantages are that the head of the mandrel expands the wall of the rivet so that the wall does not spring back to clench the nut tight. Then all parts of the rivet are not mechanically locked together. The strength limitations imposed on the tubular rivet by the need for a breakable mandrel stem, while still having the mandrel strong enough to form an upset on the blind side, and yet weak enough to break at the notch after the upset is formed, puts a limit on the strength of the rivet shank which can be used. This necessarily limits the maximum shear strength of the rivet.

A third type of previously known tubular blind rivet has an axial hole of varying diameter. To expand the rivet, a mandrel is forced straight through the axial hole, so that the hole acquires a uniform diameter and the wall is accordingly expanded. No part of the mandrel is detached, the largest part being pulled all the way through the rivet. This rivet has the disadvantages of the methods described above, as well as others. For example, the upset on the blind side can have only a relatively small bearing area, since the size of the upset is limited by the available wall thickness. In setting such a rivet, the plates to be joined are not steadily drawn together, and a loose joint may result. There is no positive inspection check, and it is not very highly resistant to vibration.

In a slightly different method of blind riveting, a screw is passed through a tubular rivet from the head end of the rivet, and an expander nut is threaded onto the end of the screw which protrudes from the shank end of the rivet. This assembly is then inserted through aligned holes in sheets to be joined. The expander nut is pulled into the tubular rivet to form an upset at its blind end by turning the screw so as to move the expander nut along the screw's longitudinal axis. After the nut is pulled into the rivet, the screw may be unthreaded therefrom. The expander nut used in this method is simply a body of larger size than the hole in the tubular rivet. The outer contour provides for expansion or upset of the wall of the tubular rivet, but does not provide for drawing the wall into tight contact with the expander nut. This results in expanding the wall of the blind or shank end during setting to a diameter which is significantly greater than the largest diameter of the expander nut. Such a stretching of the wall of the tubular rivet beyond the absolute minimum required to admit the expander nut is undesirable since it decreases the restoring or gripping forces exerted by the walls which tend to clench and hold the expander nut in place and the nut is apt to be loose in the rivet shank.

Examples of the above previously known blind riveting practices will be found in U.S. Patents 2,588,907 to Colley; 2,533,488 to Forman et al.; 2,146,461 to Bettington; 2,296,470 to Keehn; and 2,381,113 to Cook.

In accordance with this invention, a tubular rivet having a head and a shank with an axial hole therethrough is set by pulling an expander nut into the blind end of the rivet by an axial force exerted on a mandrel that is threaded into the expander nut. The expander nut has a curved deflector section which makes the initial contact with the rivet, and which causes the tubular rivet to undergo columnar failure to fill the hole. It also enlarges the protruding end of the rivet by deflecting the same as it is pulled thereinto.

The expander nut is provided with a locking section of greater radius than the deflector section. This locking section has axially oriented grooves therein, and has a shoulder at its edge nearest the deflector section. This locking surface exerts a restoring, somewhat "curling," force on the inside of the tubular rivet, which tends to pull the tubular rivet back toward its central axis so that it closely embraces and holds the nut. There thus results a blind rivet wherein the expander nut is held in the tubular rivet. In addition, when the mandrel is withdrawn a core screw can be inserted, if desired, so as to close and seal the hole through the rivet, or to serve as attachment means. The tight retention of the expander nut not only adds strength to the riveted joint but enables the nut to be used as attachment means to which objects can be threaded.

A related feature resides in a strong mandrel which is threadably attached to the expander nut for drawing the nut into the rivet. It may be unthreaded after the setting operation and reused for setting other rivets. The mandrel is made strong so that it may have a thin cross-section for resisting the necessary setting forces. This permits the use of a tubular rivet having thicker walls and smaller axial holes than were heretofore possible.

The relative strengths of the mandrel, expander nut, and tubular rivet permit the use of stronger rivet materials, and larger rivet-material cross-section. The forces developed in setting this rivet are less limited by the physical dimensions of the component parts in this invention than in conventional blind rivets.

An optional feature resides in a retainer section having means for securely holding a core bolt or screw in the axial hole of the rivet when it is desired to plug that hole.

Among the advantages of the present invention are the following: a uniform swelling of the rivet's shank; greater shear and tension resistance compared to conventional blind rivets; a complete and positive mechanical locking of component parts; a positive inspection check; clamping action on the sheets during setting; relatively small protrusion both before and after setting, compared to conventional blind rivets; and a wide range of total sheet thicknesses which may be joined by a rivet of given dimensions.

The foregoing and other features and advantages will be fully understood from the following detailed description and the accompanying drawings, of which:

Fig. 1 is an elevation, partly in cross-section, of a rivet set by an expander nut according to the invention;

Fig. 2 is a cross-section of a countersink head type of unset tubular rivet used as the rivet of Fig. 1;

Fig. 3 is a cross-section of an unset flat-headed tubular rivet which may be used alternatively to that of Fig. 2;

Fig. 4 is a side elevation of an expander nut used in setting the rivet of Fig. 1 according to the present invention;

Fig. 5 is an end view taken at line 5—5 of Fig. 4;

Fig. 6 is an end view taken at line 6—6 of Fig. 4;

Figs. 7–9 inclusive are views partly in cross-section showing progressive steps in the setting of the rivet of Fig. 1;

Fig. 10 is a plan view of a mandrel used in setting the rivet as shown in Figs. 7 to 9; and Fig. 11 is an end view taken on line 11—11 of Fig. 10.

Referring to the drawings, Fig. 1 shows a blind rivet in accordance with this invention applied through a pair of flat plates 20 and 21. The tubular rivet itself, illustrated in Fig. 2, comprises a cylindrical shank 23 with an integral countersink type of head 24. The tubular rivet has a central axis 24a. An axial hole 25 passes through the rivet so that the shank has an annular wall, as is common in blind rivet construction. The inner and outer edges of the shank end may conveniently be slightly chamfered if desired. The expander nut 22 which sets the rivet is drawn into the lower end of the rivet shank as shown in Fig. 1 to upset the portion of the shank back of plate 21. In accordance with common practice, the outer radius of the tubular rivet may be substantially the same, although it may be a few thousandths of an inch under the radius of the hole to provide for easy installation and for manufacturing tolerances.

While the rivet in Fig. 1 is shown as having a countersink type head, it will be understood that some other type of head could be used instead, such as the protruding flat head type as shown in Fig. 3. This latter type has a tubular shank 26, a flat protruding head 27, and an axial hole 28 therethrough.

Figs. 10 and 11 show a mandrel 29 having an elongated cylindrical shank 30 with threads 31 on one end, and with a flat head 32 on the other. A lug 32a projects from and extends diametrically across the flat head 32. The shank of the mandrel has a diameter smaller than the hole inside the tubular rivet to be set, so that it may be passed therethrough, the longitudinal axes of the rivet and the mandrel coinciding. The threads on the end of the mandrel are to be threadably engaged to the expander nut 22.

The expander nut 22 (see Fig. 4) is round and has a central hole 33 extending concentrically with the nut's central axis between two opposite faces, 34, 35. The central hole 33 has internal threads 36 matching the threads 31 on the mandrel. As shown in Figs. 1 and 4, face 34 is the first part of the nut to be pulled into the axial hole 25 of the rivet in the setting procedure, and is therefore threaded to the mandrel closest to the rivet.

An inner chamfered surface 37 makes an angle $\phi$ with face 34, angle $\phi$ preferably being about 45°. This chamfered surface 37 joins face 34 and hole 33, and facilitates the threading of the nut onto the mandrel. The expander nut 22 has an outer surface whose configuration will be described, beginning at face 34. A deflector section 38 is contiguous to the face 34. In axial cross-section, this surface is curved and outwardly convex. It is preferably, although not necessarily, circularly arcuate as shown in Fig. 4. Deflector section 38 departs from face 34 at an initial angle $\theta$ which is preferably about 60°, although it may be as small as 25°. This deflector section is a frustum of a surface of revolution symmetrical about the central axis 38a of the expander nut. The radius of the deflector section measured from the central axis 38a has its least value at face 34, and its greatest value at a location spaced from face 34. The radius increases away from the face 34. As shown in the drawings, the preferred location for the greatest radius is at its intersection with a spacer surface 40.

A locking section 40a comprising an engaging surface 42 which is preferably cylindrical, as shown, and a pair of shoulders 41 and 43, is axially spaced from the deflector section by the spacer surface 40. The engaging surface 42 has a knurling of axially oriented grooves 42a therein which preferably extend for substantially the full length of the engaging section, as shown. The engaging surface 42 is a surface of revolution symmetrical about the central axis 38a. The engaging surface 42 extends axially; that is to say, it has a substantial axial dimension which is the "width" of the "band." The radius of engaging surface 42a measured from the said central axis is greater than the greatest value of the radius of the deflector surface. In order that the rivet assembly can be passed through registering holes in plates to be joined, the maximum nut radius will not ordinarily be substantially larger than the maximum radius of the rivet shank. In practice, the nut will also be no longer than the holes in the plates. Some of the clearances in the drawings have been exaggerated for purposes of illustration. As is evident from the drawings, the radius of the engaging surface 42 is the largest radial dimension between the face 34 and the shoulder 43, which is the edge of the engaging surface farthest removed from the face 34. In fact, the radius of the engaging section 42 is preferably the greatest radial dimension of the entire expander nut.

It will be observed that the axial grooves 42a give the engaging surface 42 a "toothed" contour for purposes later to be described.

A shoulder 41 joins the edge of engaging surface 42 closest to face 34. This shoulder 41 extends from its contiguity with the engaging surface 42 inward toward the central axis 38a. Another shoulder 43 joins the edge of engaging surface 42 farthest from face 34. This shoulder 43 also extends from its contiguity with the cylindrical surface 42 inward toward the central axis 38a. Both shoulders 41 and 43 may conveniently be curved in axial cross-section, being convex outwardly, and also being surfaces of revolution symmetrical about central axis 38a. It will be observed that this nut is a one-piece structure which is unitary and unslotted from shoulder 43 to face 34.

A retainer section 44 adjoins shoulder 43. Its purpose is to grip and retain the threads of a core screw if a core screw is threaded into the expander nut after the rivet is set.

The retainer section is not necessary to the setting of the rivet and may be omitted from the nut if core screws or bolts are not to be used in the finally set rivet. The retainer section is disposed at the lower end of the nut, adjacent to face 35. The retainer section is in the form of a frustum of a surface of revolution and tapers inwardly toward face 35. Six slots 45 are cut radially in the retainer section, with the planes of the slots passing through the central axis of the nut. Some other number besides six may be used, or the slots may be omitted entirely. These slots make the retainer section into a plurality of spring-like members 46 effective for locking a core bolt when a core bolt is used.

As is best shown in Fig. 4 the retainer section may be bent toward the central axis of the nut after the slots are cut so as to reduce the diameter of the threaded hole 33 in the nut near that end by bending the spring-like members inwardly. Then when a core screw is threaded into the hole, it will be firmly gripped by these members and retained therein.

Shoulder 41 also includes a portion contiguous to spacer surface 40 that is an outwardly concave surface of revolution, which smoothly joins the convex portion that is contiguous to engaging surface 42. The term "smoothly joins" as used in connection with shoulder 41 refers to an absence of discontinuities or abrupt changes in shape, and does not mean that the curved portions of shoulder 41 must necessarily directly abut each other.

The radius of deflector section 38 which increases away from face 34 is measured perpendicular to the central axis.

The setting of a rivet will now be described, and it will be understood that the flat headed rivet of Fig. 3 can be set in the same manner as the countersink type rivet of Fig. 2. Referring to Fig. 7, there is shown a loose rivet assembly inserted through aligned holes 47, 48 in plates 20, 21 respectively. The upper end of hole 47 is countersunk as at 49 to match the head 24 when the rivet has the countersink type head. The lower end of hole 48 may conveniently be chamfered as at 50 to remove burrs to permit better expansion of the lower end of the tubular rivet when it is upset, and to improve the nature of the bearing surface between the upset rivet head and the plates by increasing the area of direct contact between them. The shank 30 of the mandrel 29 has a smaller diameter than hole 25 in the rivet; thus the mandrel 29 can be inserted through the axial hole 25 of the rivet, as shown, with the threads 31 protruding from the shank end of the rivet. An expander nut 22 is threaded onto the mandrel so that face 34 and deflector section 38 are next to the rivet's shank end. The diameter of intersection 39 is preferably, although not necessarily, slightly larger than the diameter of the axial hole of the rivet. This assembly, consisting of mandrel, nut, and tubular rivet, is then inserted into holes 47 and 48; and to enable this to be done the maximum diameter of the nut should not ordinarily substantially exceed the outside diameter of the rivet shank, which should be somewhat less than that of the holes in the plates. In blind riveting where there is no access to the back of the work, the nut diameter will, of course, be less than the diameter of the hole, or the nut cannot be passed therethrough to the back of the plates.

There is then attached to the rivet assembly a puller or some other setting device for pulling the mandrel along its longitudinal axis, while bucking or pushing the head of the rivet against the work. Such devices are well-known, and require no further discussion here. Generally speaking, and as shown in Fig. 8, a chuck 51 is clamped around the head 32 of the mandrel, and a nose piece 52, opposed to the chuck, is bucked against the head of the tubular rivet. Force on nose piece 52 holds the rivet against plate 20, and the opposed forces between the chuck 51 and the nose piece 52 will pull the nut into the tubular rivet to upset the lower end of the rivet shank.

Figs. 8, 9, and 1 show successive steps in the setting of this rivet. In Fig. 8, the mandrel and nut have been pulled so that the lower end of the tubular rivet has passed the deflector section 38 and part of the spacer surface 40. The action of the nut compresses and produces flow of the shank material so that the diameter of the shank expands and tends to fill the space around the rivet in the holes 47, 48. This expansion of the shank begins even before the nut has moved to create any appreciable spread at the end of the rivet, and is a consequence of a columnar failure in the rivet on account of the compressive force exerted by the nut. This hole-filling action is different from that provided in most blind rivets (where a hole-filling feature is provided), in that most conventional types undergo a "hoop" swelling, or radial expansion caused by passage of a mandrel through the tubular rivet. At the same time the curvature of the deflector section spreads the lower end of the rivet's shank so that it expands and flares slightly away from the spacer surface 40. The end of the shank is thus made somewhat conical about the central axis of the rivet as the expander nut is first pulled into the rivet.

Fig. 9 shows the nut drawn still farther into the rivet, so that the end of the rivet has passed along the cylindrical surface of the locking section 40a. The longitudinal knurling (grooves 42a) bite into the inside of the tubular rivet, and keep the nut from rotating. The knurling also exerts a frictional and weakening force on the inside of the tube, which causes the tube to "curl" inward, as will be more fully described below. In the upsetting of this rivet, the shank end receives a permanent deformation or set. However, in creating this set, it is desirable to stretch the wall material as little as possible. This is because the restoring forces tending to clench the wall around the nut will be less the more the material is stretched beyond the elastic limit in the setting process. For example, if the end of the shank were to continue to expand conically in the manner illustrated in Fig. 8, then the tubular wall would stand away from the expander nut. It would not tightly hold the nut in the shank after the setting process. This is a disadvantage inherent in many conventional blind rivets.

Such an undesirable tendency for the tubular wall to stand away from the nut is overcome by the unique contour of my particular nut. The continued expansion of the tube end (as begun at the position illustrated in Fig.

8) is interrupted by the locking section 40a, particularly by the shoulder 41 and the engaging surface 42. It has been observed that, when rivets and nuts having the dimensions set forth below are set, the shoulder 41 makes contact with the inside of the tubular rivet, which causes the rivet to "curl" down to contact the engaging surface 42. The knurling "bites" into the tubular rivet, and exerts a retarding frictional force on its inner wall. Also, the restoring forces in the material itself probably contribute to some shrinking of the tube against the nut. Whatever the cause, and the cause is not entirely understood at the present time, there is a visible curling of the tubular rivet so that it makes a tight fit against and around the expander nut. Thus, the inner wall of the tubular rivet makes intimate contact with the nut at the nut's largest diameter, and the maximum stretching of the rivet walls is substantially limited to the maximum diameter of the nut. The relative proportions of the parts may therefore be designed so that the expansive forces cause only the minimum necessary permanent set, as well as the minimum stretching beyond the elastic limit of the material.

It will be noted that reducing the maximum deformation of the tube also reduces the maximum setting forces required.

The walls will therefore spring back and tightly clench the nut on its side, thereby locking the nut firmly in the upset head. The nut aids in making a fluid-tight seal and in making the assembly substantially proof against vibration.

Further pulling on the mandrel brings the nut to the fully set position shown in Fig. 1. Compression of the rivet by the nut has caused the outer wall of the shank to expand and completely fill holes 47, 48 and the chamfered section 50 in plate 21. The outside diameter of the upset shank protruding from the plates is considerably greater than that of the holes in the plates, so that the rivet is locked. The described shaping of the upset head gives a large bearing area and an intimate contact on the reverse, blind, side between the upset rivet head and the plate. The inside of the rivet shank has also been deformed so that some of the open space between the rivet wall and deflector section is filled with metal from the inside wall. It will be appreciated that this rivet expands after the manner of a true rivet, in that it fills the hole by virtue of a true columnar failure, and does not rely on multiple-diameter mandrels which do not produce a true "upset" expansion, but only a "hoop" expansion.

The further setting of the rivet to the condition shown in Fig. 1 has caused the nut to be drawn into the tubular rivet until the end of the rivet has passed beyond the edge of the engaging surface 42 farthest from face 34. As the end of the tube passes that edge, the "curling" action caused by surface 42 causes the tube to shrink somewhat, and overhang shoulder 43. This contraction of the end of the rivet around shoulder 43 creates a clamping action which adds to the frictional and intermolecular forces along surface 42 in retaining the expander nut in the set rivet. The minimized stretching of the tubular rivet in setting also adds to the retention forces.

After the rivet has been set, the mandrel is unthreaded, leaving the nut held tightly in the rivet's shank. If a plugged joint is desired, a core screw 53 may next be threaded into the nut. When the core screw is inserted all the way into the central hole 33 of the nut, it passes through the portion of reduced diameter inside the retainer section 44. The screw expands the spring like members 45, which press back against it, and retain the core screw tightly therein. The upper surface of the tubular rivets may be countersunk as at 54 to permit the use of a countersink type screw 53 so that a completely flush surface may be obtained at the exposed head 24 of the rivet.

Since the rivet shank is to be deformed, the nut should be stronger and harder than the rivet material. Furthermore, in order that the rivet may be as strong as possible, its wall should be as thick as possible, which means that the axial hole therethrough should be relatively small. This dictates a mandrel having a relatively small diameter. Since the mandrel must not break during the setting operation, it must have great tensile strength.

As a typical example, the rivet may be made of stainless steel having a tensile strength up to 90,000 pounds per square inch; the mandrel of an alloy steel having a tensile strength of approximately 300,000 pounds per square inch; and the expander nut of an alloy steel with a tensile strength of approximately 160,000–180,000 pounds per square inch.

In the setting of a 3/16" rivet having its parts of such tensile strength, it has been found that a force of approximately 400 pounds on the mandrel is needed to pull the nut to the position of Fig. 8, where the end of the rivet is past the deflector section. A pull of approximately 800 pounds is required between the positions of Figs. 8 and 9, and approximately 1250 pounds are necessary to finally set the rivet as shown in Fig. 1.

Examples of various satisfactory rivet and nut sizes are given in the following tables. These dimensions are in inches, and the tabular headings correspond with the letters on the drawings.

*Table I.—Nut dimensions*

|  | A' | B' | C' | D' | E' | F' | G' | H' | J' | K' | L' | M' |
|---|---|---|---|---|---|---|---|---|---|---|---|---|
| 3/16 | .166 | .129 | .101 | .066 | .040 | .029 | .020 | .190 | .165 | .122 | .112 | .089 |
| 1/4 | .236 | .187 | .146 | .100 | .065 | .051 | .031 | .240 | .220 | .148 | .138 | .1065 |
| 5/16 | .308 | .248 | .193 | .135 | .091 | .073 | .043 | .300 | .275 | .174 | .164 | .1360 |
| 3/8 | .380 | .310 | .240 | .170 | .117 | .095 | .055 | .360 | .330 | .200 | .190 | .1610 |

|  | N' | P' | S' | T' | U' | V' | W' | X' | Y' | Z' |
|---|---|---|---|---|---|---|---|---|---|---|
| 3/16 | .160 | .132 | .030 | .020 | .012–.015 | .020 | .010 | .010 | .010 | .010 |
| 1/4 | .210 | .174 | .050 | .030 | .012–.015 | .013 | .013 | .013 | .013 | .013 |
| 5/16 | .258 | .216 | .076 | .040 | .012–.015 | .040 | .016 | .016 | .016 | .016 |
| 3/8 | .303 | .258 | .100 | .050 | .012–.015 | .050 | .020 | .020 | .020 | .020 |

*Table II.—Countersink rivet dimensions*

| Rivet | A | E | B | C | D | H | Z | G |
|---|---|---|---|---|---|---|---|---|
| 3/16 | .3536 / .3486 | .227 / .218 | .290 | .1130 | .1890 / .1865 | .069 / .067 | .015 / .005 | .046 / .041 |
| 1/4 | .4732 / .4682 | .279 / .268 | .320 | .1405 | .2490 / .2460 | .094 / .092 | .005 / .005 | .057 / .052 |
| 5/16 | .5619 / .5569 | .332 / .319 | .350 | .1660 | .3115 / .3085 | .105 / .103 | .005 / .005 | .068 / .063 |
| 3/8 | .6912 / .6862 | .385 / .371 | .380 | .1935 | .3740 / .3710 | .133 / .131 | .005 / .005 | .080 / .075 |

This invention provides an exceptionally strong blind rivet. Since the locking section 40a of the nut causes the rivet shank to shrink back and remain in contact with the nut as it is pulled, the maximum deformation of the rivet is substantially determined by the diameter of the locking section 40a. The total deformation is therefore largely a matter of the desired size of the upset head. The bearing area of the upset head on the adjacent plate is large compared to many conventional blind rivets.

When fully set, the rivet shank is clamped tightly around the nut. Therefore the nut is a permanent, tightly clenched part of the set rivet, and which will remain therein. The nut will not rattle, shake loose, or fall out. The retention of the nut is independent of the conditions at the pre-formed head 24, part of which may be milled off, if desired.

The threadably detachable, strong mandrel has the advantage that the setting forces used are not determined by, and need not be limited by, the breaking strength of the mandrel, as is the case in break-stem rivets. Since the forces used in setting may be made largely independent of mandrel strength, such forces may be exerted as long as is necessary to move the nut into the shank the desired distance. A reliable blind rivet is obtained in which the longitudinal movement of the nut will determine the completeness of setting, rather than the breaking of the mandrel. This results in a rivet whose properties can be predicted and regularly reproduced in rivet after rivet. This also permits an inspection check of the rivet, since such a longitudinal movement may be measured. While the mandrel is a relatively expensive item, due to its strong construction, it may be reused to upset any number of rivets, and its cost is less important.

The strong mandrel can be made relatively thinner for any given amount of pulling force than conventional mandrels. This permits the use of a stronger rivet with a thicker wall and a smaller central hole. Also, the rivet may be made of materials having greater tensile strength, resistance to shear, fatigue and other forces.

The gradual drawing of the nut into the rivet causes the plates to be pulled together during the setting operation, while the rivet shank expands within the holes to fill them firmly and completely. This drawing also results in a uniform swelling over the entire length of the rivet.

The set rivet may be used for nut plates by installing them and withdrawing the mandrel. Any desired threaded object may then be inserted. The type of head on the rivet is substantially immaterial, since countersunk head, flat head, or any other type, will hold the nut in the shank in the same manner, and so that it is useful as a nut plate.

This rivet, even when sealed with another screw, may be made entirely flush on the outer head. No secondary finish of either head is required. The small protrusion on both ends requires a minimum clearance, both during manufacturing operations and after assembly. This rivet has the further advantage that the nut may be pulled any desired distance into the tube so that a rivet of a given outer diameter and shank length can join bodies with a wide range of total thickness, thus reducing the number of rivet sizes which must be stocked.

In summary, this blind rivet has the following advantages, among others:

(1) In setting the rivet, the tubular wall swells over the full shank length to give optimum bearing qualities between the rivet and the walls of the holes in the plates to be joined.

(2) The bearing area between the upset head and the blind side of the bodies is large compared with many conventional rivets, since it is principally determined by the relative sizes of the expander nut and the cross sectional area of the metal in the tubular rivet. Due to the construction of the various parts of the rivet assembly, such cross-sectional area may be relatively large, and so may the expander nut.

(3) The preformed rivet head may be a flush, countersink type.

(4) All components of this rivet are mechanically locked.

(5) The tubular rivet may be made to have a higher shear and tension strength, and greater resistance to static and fatigue forces than conventional blind rivets.

(6) The sheets to be joined are pulled together in the setting process so that they are tightly clamped.

(7) A wide range of sheet thicknesses may be joined by a rivet of given dimensions, thus requiring a smaller total number of various rivets to be carried in stock. It is also possible to alter the length of the rivet by cutting off part of the shank to provide a shorter length.

(8) There is a positive inspection check of the set rivet.

(9) This rivet, when set, is more resistant to vibrational forces than conventional blind rivets generally.

(10) Clearance required on both sides of the work is less than in many other blind rivets, both before and after setting. This is particularly true when the rivet of this invention is compared with blind rivets which utilize multiple diameter mandrels, and which do not produce the true "upset" expansion which results from the use of this rivet.

(11) A setting tool may be used with this rivet which requires only moderate work clearance as compared with the rivet tools required for other type of blind rivets.

(12) The restoring forces in the material tend to retain the expander nut inside the tube, thus reducing any tendencies of the material to recoil and leave the rivet loose in the joined plates. The loosening effect of recoil is particularly inherent in all break-neck mandrel types. It is substantially avoided in the blind rivet of the invention by the controlled tension with which it is set.

(13) The upset rivet may be installed to be used as part of a nut plate, the threads in the expander nut being satisfactory for that purpose.

(14) The nut may be fluid-sealed by tightly plugging the hole therein, or by providing a capped or sealed end to the expander nut.

(15) There is no necessity for a secondary finish.

My invention is not limited to the embodiments described in the description and illustrated in the drawings, which are given by way of example and not of limitation, but only in accordance with the scope of the appended claims.

I claim:

1. A blind rivet assembly comprising a tubular rivet having a headed end and an unheaded end, and an expander nut, said tubular rivet being adapted to be placed in aligned holes in bodies to be joined so that its headed end bears against one side of said bodies and its unheaded end projects beyond the other side of said bodies, said expander nut being adapted to be drawn by a mandrel into the unheaded end of said tubular rivet while said unheaded end projects from said bodies, so as to expand said unheaded end to form a bulb whereby the bodies are held between the headed end of the tubular rivet and the bulb, after the expander nut is drawn into the tubular rivet, said tubular rivet comprising a tubular circular cylindrical shank having an outer radius and an inner axial hole therethrough having an inner radius, and a head integral with said shank at the headed end thereof; the expander nut having a central axis and an axial threaded hole opening at a first face of said nut in which threaded hole the mandrel is adapted to be threaded so that the expander nut can be drawn into the unheaded end of said tubular rivet by an axial pull, and an outer surface on said expander nut extending from said first face, said outer surface comprising a deflector section contiguous to said first face of the nut, said deflector section being an outwardly convex surface of revolution symmetrical about said central axis, which surface of revolution is a smooth curve in a cross section which includes the central axis, the said deflector section having a radius measured perpendicular to the central axis which increases away from said first face, the least length of said radius being at said first face and the greatest length of said radius being at an axial position spaced from said first face, said greatest radius being greater than said inner radius, a circular cylindrical surface contiguous to the deflector section, a shoulder contiguous to the cylindrical section on the opposite side thereof from the deflector section, said shoulder comprising an outwardly concave surface of revolution adjacent to said cylindrical section and an outwardly convex surface of revolution on the opposite side of the concave surface revolution from the cylindrical section, which convex surface smoothly joins the concave surface, a locking section contiguous to said shoulder on the other side thereof from the cylindrical section, said locking section comprising an engaging surface having grooves therein which grooves are parallel to the central axis, said engaging surface being a surface of revolution modified by said grooves which is symmetrical about the said central axis, the greatest radius of the said engaging surface being greater than the greatest radius of the deflector section.

2. A blind rivet assembly according to claim 1 in which the engaging surface is substantially a circular cylinder modified by the grooves.

3. A blind rivet assembly according to claim 2 in which a retainer section is provided contiguous to the locking section on the opposite side thereof from the first face, which retainer section is integral with said nut and comprises a plurality of spring-like members which are spaced from each other and which form an aperture between them of lesser radius than the radius of the axial hole in the nut, whereby an object threaded through the nut must spring apart the spring-like members in order to be threaded all the way through the nut, and is thereby retained in the nut by the spring-like members.

References Cited in the file of this patent

UNITED STATES PATENTS

| | | |
|---|---|---|
| 426,185 | Ibbotson | Apr. 22, 1890 |
| 2,168,126 | Kane | Aug. 1, 1939 |
| 2,183,543 | Cherry | Dec. 19, 1939 |
| 2,299,085 | Gade | Oct. 20, 1942 |
| 2,319,376 | Wallace | May 18, 1943 |
| 2,381,113 | Cook | Aug. 7, 1945 |
| 2,384,321 | Lees | Sept. 4, 1945 |
| 2,384,729 | Darby | Sept. 11, 1945 |
| 2,407,070 | Funk | Aug. 20, 1946 |
| 2,407,830 | Griffin | Sept. 17, 1946 |
| 2,490,549 | Madden | Dec. 6, 1949 |
| 2,588,372 | Erb | Mar. 11, 1952 |
| 2,722,259 | Eckenbeck | Nov. 1, 1955 |

FOREIGN PATENTS

| | | |
|---|---|---|
| 536,476 | Great Britain | May 15, 1941 |

UNITED STATES PATENT OFFICE
CERTIFICATE OF CORRECTION

Patent No. 2,959,999                      November 15, 1960

George S. Wing

It is hereby certified that error appears in the above numbered patent requiring correction and that the said Letters Patent should read as corrected below.

Columns 7 and 8, Table I.- Nut dimensions, under the heading "V'", line 2 thereof, for ".013" read -- .030 --; column 11, line 16, after "surface" insert -- of the --.

Signed and sealed this 3rd day of October 1961.

(SEAL)
Attest:

ERNEST W. SWIDER
Attesting Officer

DAVID L. LADD
Commissioner of Patents
USCOMM-DC